United States Patent
Baur

(10) Patent No.: US 10,166,924 B2
(45) Date of Patent: Jan. 1, 2019

(54) VEHICLE VISION SYSTEM WITH DISPLAY BY A MIRROR

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 13 days.

(21) Appl. No.: 15/585,419

(22) Filed: May 3, 2017

(65) Prior Publication Data

US 2017/0327044 A1    Nov. 16, 2017

Related U.S. Application Data

(60) Provisional application No. 62/334,506, filed on May 11, 2016.

(51) Int. Cl.

| | |
|---|---|
| G02B 27/14 | (2006.01) |
| G09G 5/00 | (2006.01) |
| B60R 1/04 | (2006.01) |
| G08G 1/16 | (2006.01) |
| G02B 27/01 | (2006.01) |
| B60R 1/08 | (2006.01) |
| G08G 1/0962 | (2006.01) |

(52) U.S. Cl.
CPC ............... B60R 1/04 (2013.01); B60R 1/08 (2013.01); G02B 27/0101 (2013.01); G08G 1/0962 (2013.01); G08G 1/167 (2013.01); B60K 2350/106 (2013.01); B60K 2350/1088 (2013.01); B60K 2350/2013 (2013.01); B60K 2350/927 (2013.01); G02B 2027/013 (2013.01)

(58) Field of Classification Search
CPC .... G02B 7/198; G02B 7/1824; G02B 7/1827; B60R 1/04; B60R 1/072
USPC ................................ 359/844, 871, 872, 630
See application file for complete search history.

(56) References Cited

U.S. PATENT DOCUMENTS

| | | |
|---|---|---|
| 2,263,382 A | 11/1941 | Gotzinger |
| 2,580,014 A | 12/1951 | Gazda |
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |

(Continued)

FOREIGN PATENT DOCUMENTS

WO    2017191558 A1    11/2017

*Primary Examiner* — William Choi
(74) *Attorney, Agent, or Firm* — Honigman Miller Schwartz and Cohn, LLP

(57) ABSTRACT

A vision system for a vehicle includes an interior rearview mirror assembly disposed at an interior surface of the vehicle and having a mirror head and a reflective element. The mirror head is adjustably mounted at a mirror mount that attaches at the interior surface of the vehicle and is adjustable to adjust a rearward view of a driver of the vehicle viewing said reflective element. A display device is disposed at an interior portion of the vehicle remote from the interior rearview mirror assembly. The mirror head is adjustable between a mirror mode orientation, where the driver of the vehicle views rearward of the vehicle via the reflective element, and a display mode orientation, where the driver of the vehicle views images displayed by the display device via the reflective element.

20 Claims, 4 Drawing Sheets

(56) References Cited

U.S. PATENT DOCUMENTS

| | | |
|---|---|---|
| 4,630,904 A | 12/1986 | Pastore |
| 4,721,364 A | 1/1988 | Itoh et al. |
| 4,793,690 A | 12/1988 | Gahan et al. |
| 4,906,085 A | 3/1990 | Sugihara et al. |
| 5,193,029 A | 3/1993 | Schofield et al. |
| 5,285,060 A | 2/1994 | Larson et al. |
| 5,313,335 A | 5/1994 | Gray et al. |
| 5,355,284 A | 10/1994 | Roberts |
| 5,416,313 A | 5/1995 | Larson et al. |
| 5,436,741 A | 7/1995 | Crandall |
| 5,481,409 A | 1/1996 | Roberts |
| 5,530,240 A | 6/1996 | Larson et al. |
| 5,550,677 A | 8/1996 | Schofield et al. |
| 5,575,552 A | 11/1996 | Faloon et al. |
| 5,587,699 A | 12/1996 | Faloon et al. |
| 5,668,663 A | 9/1997 | Varaprasad et al. |
| 5,670,935 A | 9/1997 | Schofield et al. |
| 5,715,093 A | 2/1998 | Schierbeek et al. |
| 5,724,187 A | 3/1998 | Varaprasad et al. |
| 5,760,962 A | 6/1998 | Schofield et al. |
| 5,786,772 A | 7/1998 | Schofield et al. |
| 5,788,357 A | 8/1998 | Muth et al. |
| 5,796,094 A | 8/1998 | Schofield et al. |
| 5,877,897 A | 3/1999 | Schofield et al. |
| 5,938,320 A | 8/1999 | Crandall |
| 6,005,724 A | 12/1999 | Todd |
| 6,045,243 A | 4/2000 | Muth et al. |
| 6,097,023 A | 8/2000 | Schofield et al. |
| 6,111,683 A | 8/2000 | Cammenga et al. |
| 6,201,642 B1 | 3/2001 | Bos |
| 6,222,447 B1 | 4/2001 | Schofield et al. |
| 6,257,746 B1 | 7/2001 | Todd et al. |
| 6,264,353 B1 | 7/2001 | Caraher et al. |
| 6,320,176 B1 | 11/2001 | Schofield et al. |
| 6,329,925 B1 | 12/2001 | Skiver et al. |
| 6,356,376 B1 | 3/2002 | Tonar et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,498,620 B2 | 12/2002 | Schofield et al. |
| 6,512,624 B2 | 1/2003 | Tonar et al. |
| 6,559,435 B2 | 5/2003 | Schofield et al. |
| 6,590,719 B2 | 7/2003 | Bos |
| 6,690,268 B2 | 2/2004 | Schofield et al. |
| 6,700,692 B2 | 3/2004 | Tonar et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,831,261 B2 | 12/2004 | Schofield et al. |
| 6,902,284 B2 | 6/2005 | Hutzel et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,224,324 B2 | 5/2007 | Quist et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,446,924 B2 | 11/2008 | Schofield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,734,392 B2 | 6/2010 | Schofield et al. |
| 7,777,611 B2 | 8/2010 | Desai |
| 7,855,755 B2 | 12/2010 | Weller et al. |
| 7,914,187 B2 | 3/2011 | Higgins-Luthman et al. |
| 8,027,029 B2 | 9/2011 | Lu et al. |
| 8,154,418 B2 | 4/2012 | Peterson et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,730,553 B2 | 5/2014 | De Wind et al. |
| 8,861,792 B2 | 10/2014 | Stein et al. |
| 8,890,955 B2 | 11/2014 | Peterson |
| 8,917,437 B2 | 12/2014 | Baur et al. |
| 9,057,875 B2 | 6/2015 | Fish, Jr. et al. |
| 9,205,780 B2 | 12/2015 | Habibi et al. |
| 9,280,202 B2 | 3/2016 | Gieseke et al. |
| 9,346,403 B2 | 5/2016 | Uken et al. |
| 9,598,016 B2 | 3/2017 | Blank et al. |
| 9,827,913 B2 | 11/2017 | De Wind et al. |
| 2006/0050018 A1 | 3/2006 | Hutzel et al. |
| 2006/0171704 A1 | 8/2006 | Bingle et al. |
| 2008/0211735 A1* | 9/2008 | Balcerzak ........... B60R 11/0235 345/3.1 |
| 2009/0015736 A1 | 1/2009 | Weller et al. |
| 2009/0161241 A1 | 6/2009 | Wang et al. |
| 2009/0167670 A1 | 7/2009 | Peng et al. |
| 2009/0244361 A1 | 10/2009 | Gebauer et al. |
| 2010/0097469 A1 | 4/2010 | Blank et al. |
| 2010/0165437 A1 | 7/2010 | Tonar et al. |
| 2010/0201816 A1 | 8/2010 | Lee et al. |
| 2010/0214791 A1 | 8/2010 | Schofield |
| 2012/0062743 A1 | 3/2012 | Lynam et al. |
| 2012/0162427 A1 | 6/2012 | Lynam |
| 2013/0250114 A1 | 9/2013 | Lu |
| 2014/0160284 A1 | 6/2014 | Achenbach et al. |
| 2014/0285666 A1 | 9/2014 | O'Connell et al. |
| 2014/0333729 A1 | 11/2014 | Pflug |
| 2014/0340510 A1 | 11/2014 | Ihlenburg |
| 2014/0347488 A1 | 11/2014 | Tazaki et al. |
| 2015/0022664 A1 | 1/2015 | Pflug et al. |
| 2015/0049193 A1 | 2/2015 | Gupta et al. |
| 2015/0232030 A1 | 8/2015 | Bongwald |
| 2015/0251602 A1 | 9/2015 | Baur et al. |
| 2015/0294169 A1 | 10/2015 | Zhou et al. |
| 2015/0296135 A1 | 10/2015 | Wacquant et al. |
| 2016/0375833 A1 | 12/2016 | Larson et al. |
| 2017/0297498 A1 | 10/2017 | Larson et al. |
| 2017/0355312 A1 | 12/2017 | Habibi et al. |
| 2018/0134217 A1 | 5/2018 | Peterson et al. |

* cited by examiner

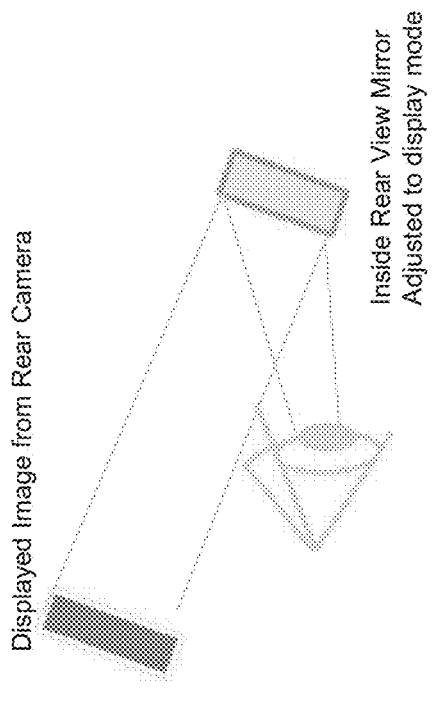
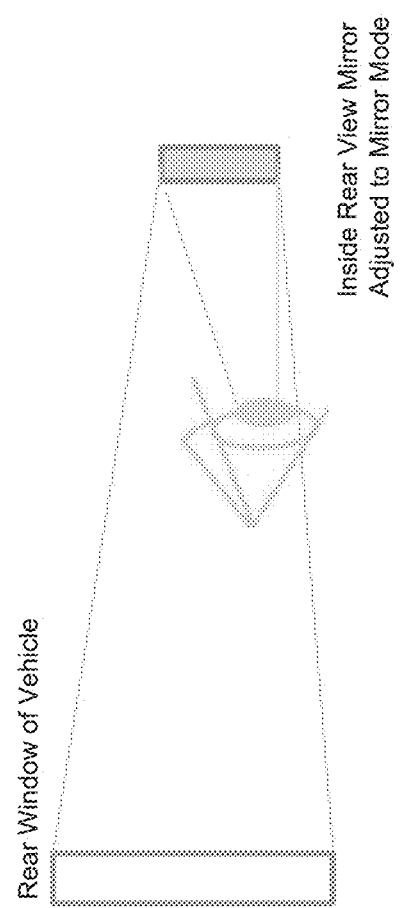
FIG. 5
FIG. 4

VEHICLE VISION SYSTEM WITH DISPLAY BY A MIRROR

CROSS REFERENCE TO RELATED APPLICATION

The present application claims the filing benefits of U.S. provisional application Ser. No. 62/334,506, filed May 11, 2016, which is hereby incorporated herein by reference in its entirety.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly. A variety of interior and exterior mirror assemblies with indicators and/or displays are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of captured images for viewing by the driver of the vehicle. A video display screen is disposed in the vehicle cabin and is viewable at the interior rearview mirror assembly. The mirror head and reflective element of the mirror assembly can be adjusted or flipped between a mirror mode orientation, where the driver of the vehicle views rearward of the vehicle via the mirror reflective element, and a display mode orientation, where the driver of the vehicle views images displayed by the display device via the mirror reflective element. The display device may be disposed at a ceiling portion of the cabin of the vehicle, such that the mirror head and reflective element may be adjusted upward to the display mode orientation.

These and other objects, advantages, purposes and features of the present invention will become apparent upon review of the following specification in conjunction with the drawings.

BRIEF DESCRIPTION OF THE DRAWINGS

FIG. 4 is a schematic showing the mirror assembly of the present invention when in a mirror mode orientation, where the driver is viewing rearward of the vehicle via the reflective element;

FIG. 5 is a schematic showing the mirror assembly of the present invention when in a display mode orientation, where the driver is viewing displayed images via the reflective element;

DESCRIPTION OF THE PREFERRED EMBODIMENTS

Figure 1:
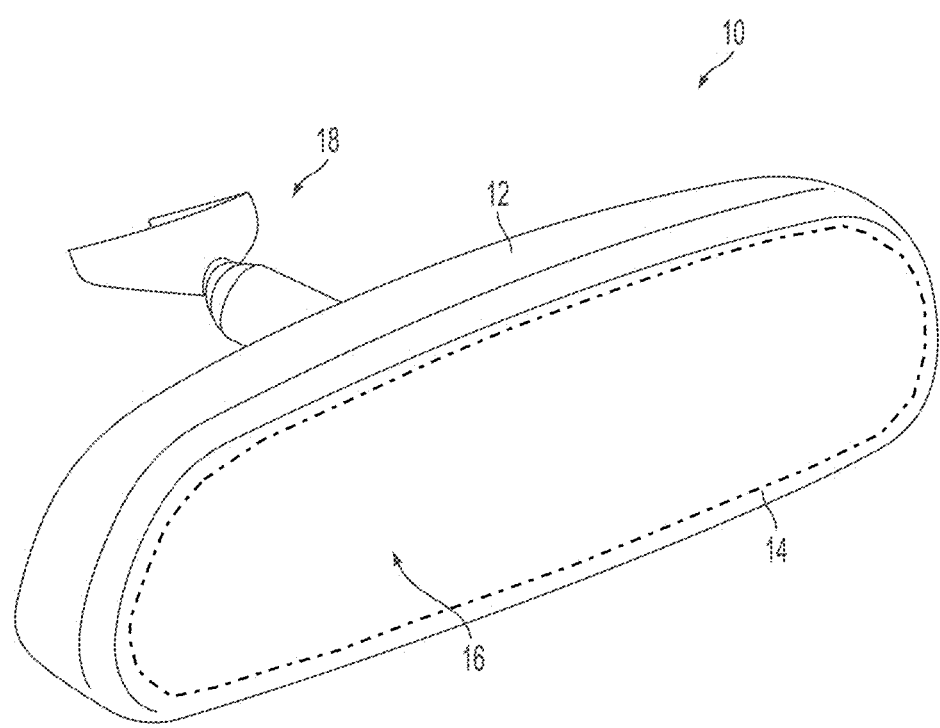
FIG. 1 is a perspective view of an interior rearview mirror assembly suitable for use with the display system of the present invention.

Referring now to the drawings and the illustrative embodiments depicted therein, an interior rearview mirror assembly 10 for a vehicle includes a casing 12 that houses a reflective element 14 and a display device, which provides a display area 16 visible to the driver of the vehicle through the reflective element 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

The automotive market will soon adapt a new dual function interior rearview mirror assembly. The interior mirror can be used as a traditional mirror assembly, but can also be changed to a video monitor, such as through a use of a transflective surface and a high intensity display transposed behind the transflective surface, such as by utilizing aspects of the mirror assemblies described in PCT Application No. PCT/IB2017/052542, filed May 2, 2017, and/or U.S. Publication No. US-2016-0375833 and/or U.S. provisional applications, Ser. No. 62/476,951, filed Mar. 27, 2017, Ser. No. 62/466,089, filed Mar. 2, 2017, Ser. No. 62/355,460, filed Jun. 28, 2016, and/or 62/334,506, filed May 11, 2016, which are all hereby incorporated herein by reference in their entireties.

Figure 2:
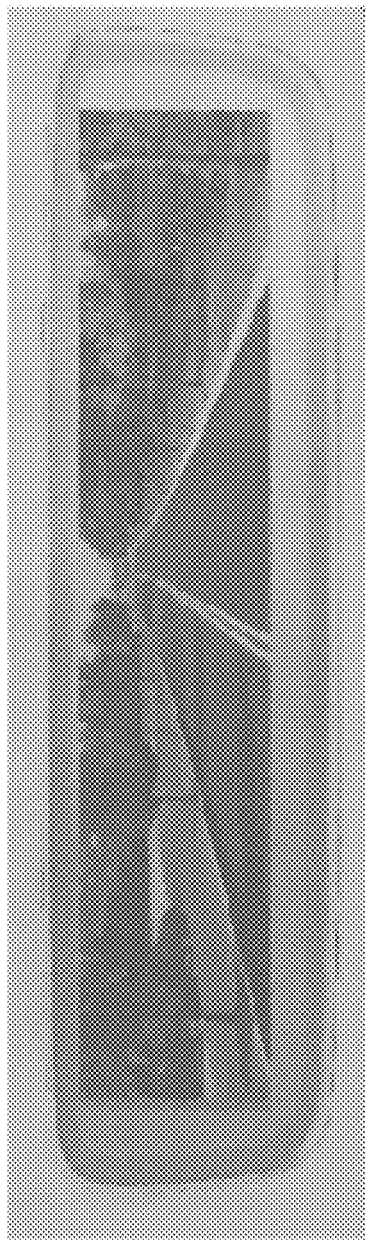
FIG. 2 is a plan view of an interior rearview mirror assembly with a display screen disposed behind the reflective element.
Figure 3:
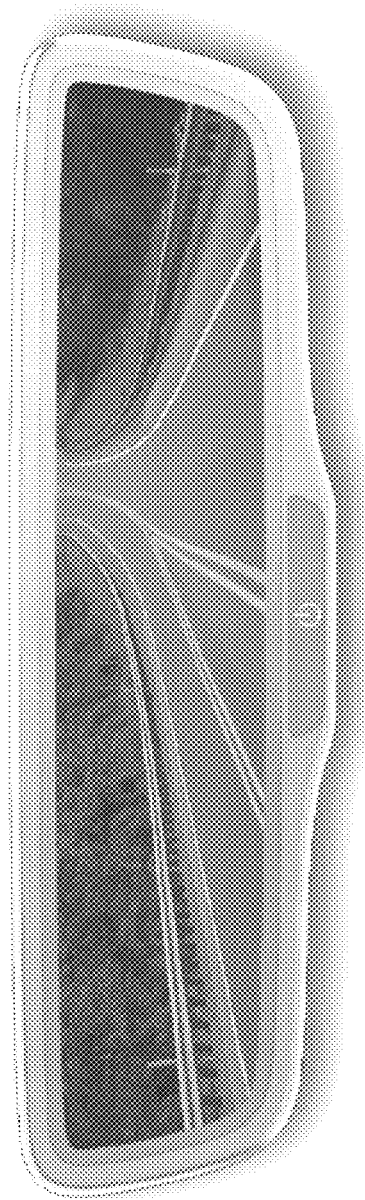
FIG. 3 is a plan view of an interior rearview mirror assembly of the present invention, shown reflecting a displayed image across the entire reflective area of its reflective element.

A difficulty that occurs in the full screen display approach is to create a video image that is shaped to the reflective surface desired in the mirror assembly. As can be seen with reference to FIG. 2, use of a display through a transflective mirror reflective element may result in large and oddly shaped areas that remain between the displayed image and the reflective surface of the mirror reflective element (whereby the displayed image is reduced in size to accommodate this). As shown in FIG. 3, a desired execution of a display through a transflective mirror element may provide evenly shaped areas or no areas that remain between the displayed image and the reflective surface (whereby the displayed image is maximized in size with such an approach).

The present invention provides a display system that can display video images across the entire reflective surface of an interior rearview mirror assembly. The display system includes a display device disposed at an upper region of the vehicle's interior cabin (or other location), such that, when the mirror head is tilted or angled or otherwise mechanically adjusted, the mirror reflective element reflects the displayed image across the entire reflective surface for viewing by the driver of the vehicle. For example, and such as shown in FIGS. 4 and 5, when the mirror head is adjusted to a "mirror mode", the driver can view the rearward field of view provided by the reflective element, but when the mirror head is tilted or adjusted upward toward the display (to a "display mode"), the displayed video images (such as derived from image data captured by a rearward viewing camera) are reflected at the mirror reflective element for viewing by the driver of the vehicle. Thus, by disposing the display at the top of a vehicle's interior cabin (or other locations), the mirror can be mechanically adjusted to fully reflect the displayed image across the entire reflective surface.

When the mirror is in the display mode, the driver views the displayed images as reflected off of substantially the entire reflective surface of the mirror, and the driver does not view rearward through the rear window of the vehicle when the mirror is in the display mode. Likewise, when the mirror is in the mirror mode, the driver does not view displayed images displayed by the display device. In other words, the fields of view of the mirror as viewed by the driver of the vehicle (when in the mirror mode and the display mode) do not overlap such that the driver either views the scene rearward of the vehicle (through the rear window of the vehicle) when the mirror is in the mirror mode, or the driver views the images or information displayed at the ceiling-located display device when the mirror is in the display mode.

The driver may manually adjust the mirror head between the mirror mode orientation and the display mode orientation, such as by pivoting the mirror head in a normal manner. Optionally, the mirror head may have a toggle or the like that toggles or flips the mirror head between a mirror mode and a display mode (such as a toggle that functions in a similar manner as prismatic mirror toggles that flip a prismatic mirror between day and night orientations). Optionally, the mirror system may be electronically adjusted (such as via an actuator of the mirror assembly) to adjust or pivot the mirror head between the mirror mode orientation and the display mode orientation. For example, the mirror actuator may move the mirror head to the display mode orientation responsive to a user input or responsive to the driver shifting the vehicle into a reverse gear, whereby a rear backup camera is actuated and the display displays video images derived from image data captured by the rear backup camera. Optionally, when the mirror head is pivoted or adjusted to the display mode orientation, the display screen is actuated responsive to the adjustment of the mirror head (or responsive to the same user input that causes adjustment of the mirror head), and the display screen is deactivated when the mirror head is adjusted or pivoted to the mirror mode orientation (or responsive to the same user input that causes the mirror head to pivot to the mirror mode orientation).

Figure 6:
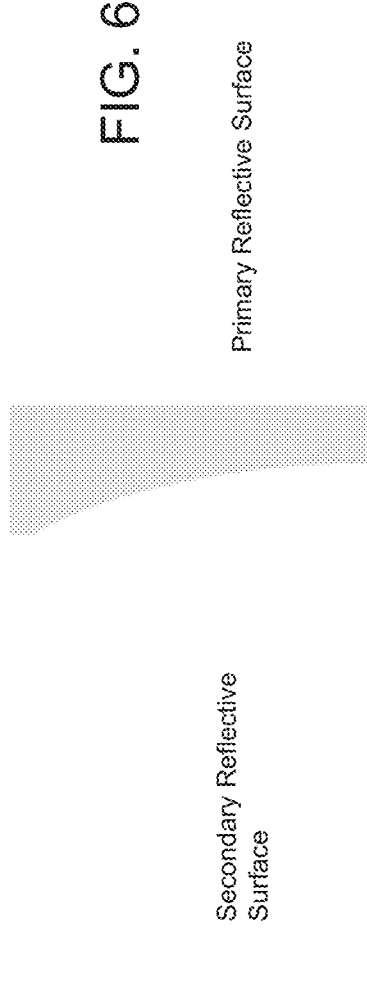
FIG. 6 is a schematic showing a mirror reflective element suitable for use in the display system of the present invention, shown with the front surface of the reflective element being concave-shaped and having a transflective reflector established thereat.
Figure 7:
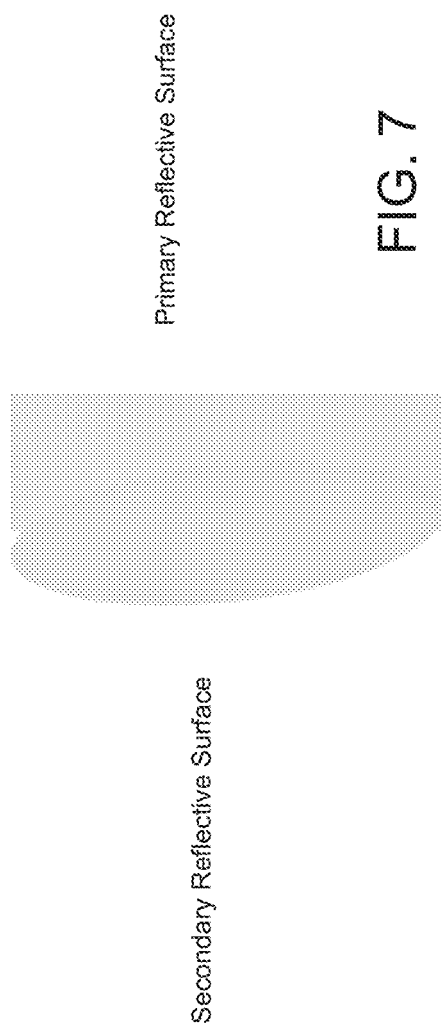
FIG. 7 is a schematic showing another mirror reflective element suitable for use in the display system of the present invention, shown with the front surface of the reflective element being convex-shaped and having a transflective reflector established thereat.

Optionally, the mirror reflective element may also include reflective surfaces of differing magnifications (curvatures) in order to minimize or enhance the reflected images displayed by the remote display. For example, and such as shown in FIG. 6, by placing a secondary concave transflective surface in front of the traditional planar primary reflective element, the display size (as reflected at the reflective element) can be minimized. Thus, when the mirror head is in the mirror mode orientation, the driver views reflections off of the planar rear primary reflective surface of the reflective element, and when the mirror head is in the display mode orientation, the driver views reflections off of the concave front secondary reflective surface. In order to reduce or mitigate or avoid the creation of double images, the axis of the concaved surface may be tilted and arranged similar to today's planar prismatic mirrors. Similarly, and such as shown in FIG. 7, by placing a secondary convex transflective surface in front of the traditional planar primary reflector, the resolution of the displayed image can be enhanced.

Optionally, in some regulatory environments, the interior mirror need not be planar which offers additional opportunities.

Further freeform or varied optical reflective surfaces offer additional opportunities. With curvatures tailored to the various axes, the display geometry and packaging can be further optimized. For example, a concaved secondary transflective surface in the vertical axis combined with a planar or convex secondary transflective surface in the horizontal axis can allow for a display to be long and narrow, which may provide better packaging options in the interior of the vehicle cabin. Such freeform or varied reflective surfaces may be achieved by utilizing aspects of the mirrors described in U.S. Pat. No. 8,917,437, which is hereby incorporated herein by reference in its entirety.

The display device is operable to display video images (such as derived from image data captured by one or more cameras of the vehicle, such as one or more cameras having rearward and/or sideward exterior fields of view and/or one or more cameras having interior fields of view in the cabin of the vehicle), which are reflected by the mirror reflective element when the mirror head is in its display mode orientation. The displayed images are reverse-image displayed, so when the displayed images are reflected at the reflective element, the driver sees the displayed images as if they were displayed via a display device in the mirror head and behind the mirror reflective element.

The display device or module may utilize aspects of the modules described in International Publication No. WO 2016/178190 and/or U.S. Publication No. US-2014-0285666, which are hereby incorporated herein by reference in their entireties.

During normal driving, it is desirable not to show too wide of a field of view in the main view, due to the distortion of the image involved with such magnification. As mentioned previously, this distortion could lead to difficulty in judging the distance to nearby vehicles. However, it is also desirable for the driver to be able to temporarily expand the field of view when needed. Dynamic head tracking would allow the system to detect when the driver is moving his or her head forward, which would automatically expand the main view field of view to provide wider coverage—similar to how one gains additional field of view with a mirror by moving one's head. Such head tracking may utilize aspects of the systems described in U.S. Pat. Nos. 9,280,202 and/or 7,914,187, and/or U.S. Publication Nos. US-2015-0296135; US-2015-0294169 and/or US-2015-0232030, which are hereby incorporated herein by reference in their entireties.

FIGS. 7A and 7B show how the displayed images may be expanded or adjusted responsive to the head tracking system or function.

Optionally, the vehicle may be equipped with a camera and/or radar and/or lidar side-lane monitoring/lane change assist system such as is disclosed in U.S. Pat. Nos. 8,027,029; 7,038,577 and/or 7,720,580, which are hereby incorporated herein by reference in their entireties. For example, a side/rear viewing camera (such as a camera mounted in a driver-side exterior mirror assembly of the equipped vehicle or in a side body panel or in a side-pillar of the equipped vehicle) has a field of view at least sideward and rearward of the equipped vehicle to capture image data of objects such as other vehicles or motorcyclists or bicyclists present in the immediately adjacent driver-side side lane. A control of the equipped vehicle includes an image processor (such as an EyeQ® image processor available from Mobileye N.V. of Jerusalem, Israel). Image data captured by the side/rear-viewing camera of the equipped vehicle is provided to the control and is image processed by the image processor to detect the presence of any rear-approaching other vehicle and to determine distance to the other vehicle (such as by use of optical inflation as disclosed in U.S. Pat. No. 8,861,792, which is hereby incorporated herein by reference in its entirety). The speed being travelled by the equipped vehicle (such as from wheel sensors of the equipped vehicle) is also provided to the control (preferably via connection to a data communication bus of the equipped vehicle such as a CAN bus). Other vehicle data from the equipped vehicle can be provided to the control (such as yaw rate or steering angle or turn signal activation status or gear selection).

The system may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, which are hereby incorporated herein by reference in their entireties.

The camera (that captures image data for use in displaying video images) may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the camera may comprise a stereo imaging camera or the like, such as by utilizing aspects of the imaging systems described in U.S. Pat. No. 6,396,397, which is hereby incorporated herein by reference in its entirety. Optionally, the camera may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle).

Although shown and described as being incorporated at the exterior rearview mirror assembly, it is envisioned that the camera may be disposed elsewhere at the vehicle, such as at a side portion of the vehicle, and having a sideward and rearward field of view. Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the display may be mounted elsewhere in the vehicle and/or at the vehicle door or vehicle door opening, such as at the A pillar of the vehicle, or at the top of the instrument panel of the vehicle, or at the steering column of the vehicle, or at or in the headliner of the vehicle and/or the like. Optionally, as an alternative to a self-contained display monitor, the mirror and camera and display system of the present invention may provide a docking station (such as at or near the vehicle door and/or door opening of the vehicle) for a cell phone (or tablet or other personal portable display capable device), where the cell phone or personal display device may be docked or connected so that the display screen of the personal display device may function as the display and may display the images captured by the camera.

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 7,224,324; 7,253,723; 7,255,451 and/or 8,154,418, and/or International Publication Nos. WO 2012/051500; WO 2010/124064; WO 2011/044312; WO 2013/071070 and/or WO 2013/126719, which are hereby incorporated herein by reference in their entireties.

Optionally, the vision system may include or be associated with a blind spot monitoring or side object detection system that detects the presence of an object or vehicle in the side lane adjacent to the vehicle and that generates an alert to the driver of the vehicle to alert the driver of the detected object or vehicle if the driver is making a lane change into the side lane where the object or vehicle is detected in or approaching. The display screen may be operable to display alerts or warnings or graphic overlays to indicate to the driver that a vehicle or object is detected in the side lane or that the driver is making an unsafe lane change or the like.

Thus, the alert or indication at the display screen may function as a lane change assist (LCA) indicator or indicators and/or a blind spot indicator or indicators. The blind spot alerts may be activated when an object is detected (such as via utilizing aspects of the side object or blind spot detection systems or the like such as described in U.S. Pat. Nos. 7,881,496; 7,492,281; 7,720,580; 7,038,577; 6,882,287; 6,198,409; 5,929,786 and/or 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the alert or indication may function as a lane change assist alert or indication, where the host vehicle may be detected to be moving into an adjacent lane without the turn signal being activated, and an object or vehicle may be detected at the adjacent lane, whereby the LCA alert may be activated and displayed at the display screen to provide an alert to the driver of the lane change to assist the driver in avoiding unintentional lane changes and/or lane changes when a vehicle or object is detected in the adjacent lane.

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication No. US-2006-0050018, and/or International Publication No. WO 2004/058540, which are all hereby incorporated herein by reference in their entireties. The display may be viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
an interior rearview mirror assembly disposed at an interior surface of the vehicle, said interior rearview mirror assembly comprising a mirror head having a reflective element;
wherein said mirror head is adjustably mounted at a mirror mount that attaches at the interior surface of the vehicle and is adjustable to adjust a rearward view of a driver of the vehicle viewing said reflective element;
a display device disposed at an interior portion of the vehicle remote from said interior rearview mirror assembly; and
wherein said mirror head is adjustable between a mirror mode orientation, where the driver of the vehicle views rearward of the vehicle via said reflective element, and a display mode orientation, where the driver of the vehicle views images displayed by said display device via said reflective element.

2. The vision system of claim 1, wherein said display device is disposed at a ceiling portion of the cabin of the vehicle.

3. The vision system of claim 2, wherein, when said mirror head is in the display mode orientation, said reflective element is angled more upward as compared to when said mirror head is in the mirror mode orientation.

4. The vision system of claim 1, wherein, when said mirror head is in the mirror mode orientation, said reflective element is angled more toward a rear window of the vehicle as compared to when said mirror head is in the display mode orientation.

5. The vision system of claim 1, wherein said reflective element has a primary reflector established at its rear surface and a secondary transflective reflector surface established at its front surface.

6. The vision system of claim 5, wherein, when said mirror head and said reflective element are in said mirror mode orientation, the driver views rearward of the vehicle via reflections at said primary reflector.

7. The vision system of claim 6, wherein, when said mirror head and said reflective element are in said display mode orientation, the driver views displayed images via reflections at said secondary transflective reflector.

8. The vision system of claim 7, wherein said front surface of said reflective element is concave-shaped.

9. The vision system of claim 7, wherein said front surface of said reflective element is convex-shaped.

10. The vision system of claim 1, wherein the images displayed by said display device are reverse-image displayed, and wherein, when the displayed images are reflected at said reflective element when said mirror head is in the display mode orientation, the driver views the reflected displayed images as if they were displayed via a display device in said mirror head and behind said mirror reflective element.

11. The vision system of claim 1, wherein said display device is actuated responsive to said mirror head being adjusted to the display mode orientation.

12. The vision system of claim 1, wherein said display device is deactuated responsive to said mirror head being adjusted to the mirror mode orientation.

13. The vision system of claim 1, wherein said mirror head is adjusted between the display mode orientation and the mirror mode orientation responsive to a user input.

14. A vision system for a vehicle, said vision system comprising:
an interior rearview mirror assembly disposed at an interior surface of the vehicle, said interior rearview mirror assembly comprising a mirror head having a reflective element;
wherein said mirror head is adjustably mounted at a mirror mount that attaches at the interior surface of the vehicle and is adjustable to adjust a rearward view of a driver of the vehicle viewing said reflective element;
a display device disposed at an interior portion of the vehicle remote from said interior rearview mirror assembly, wherein said display device is disposed at a ceiling portion of the cabin of the vehicle;

wherein said mirror head is adjustable between a mirror mode orientation, where the driver of the vehicle views rearward of the vehicle via said reflective element, and a display mode orientation, where the driver of the vehicle views images displayed by said display device via said reflective element;

wherein, when said mirror head is in the display mode orientation, said reflective element is angled more upward as compared to when said mirror head is in the mirror mode orientation; and wherein said reflective element has a primary reflector established at its rear surface and a secondary transflective reflector surface established at its front surface.

15. The vision system of claim 14, wherein, when said mirror head and said reflective element are in said mirror mode orientation, the driver views rearward of the vehicle via reflections at said primary reflector.

16. The vision system of claim 14, wherein, when said mirror head and said reflective element are in said display mode orientation, the driver views displayed images via reflections at said secondary transflective reflector.

17. The vision system of claim 14, wherein said front surface of said reflective element is concave-shaped.

18. The vision system of claim 14, wherein said front surface of said reflective element is convex-shaped.

19. A vision system for a vehicle, said vision system comprising:

an interior rearview mirror assembly disposed at an interior surface of the vehicle, said interior rearview mirror assembly comprising a mirror head having a reflective element;

wherein said mirror head is adjustably mounted at a mirror mount that attaches at the interior surface of the vehicle and is adjustable to adjust a rearward view of a driver of the vehicle viewing said reflective element;

a display device disposed at an interior portion of the vehicle remote from said interior rearview mirror assembly;

wherein said mirror head is adjustable between a mirror mode orientation, where the driver of the vehicle views rearward of the vehicle via said reflective element, and a display mode orientation, where the driver of the vehicle views images displayed by said display device via said reflective element;

wherein said display device is actuated responsive to said mirror head being adjusted to the display mode orientation;

wherein said display device is deactuated responsive to said mirror head being adjusted to the mirror mode orientation; and wherein said mirror head is adjusted between the display mode orientation and the mirror mode orientation responsive to a user input.

20. The vision system of claim 19, wherein the images displayed by said display device are reverse-image displayed, and wherein, when the displayed images are reflected at said reflective element when said mirror head is in the display mode orientation, the driver views the reflected displayed images as if they were displayed via a display device in said mirror head and behind said mirror reflective element.

* * * * *